May 8, 1951 S. LEVY 2,551,683
INDICATOR
Filed Feb. 23, 1949 2 Sheets-Sheet 1

INVENTOR
SIDNEY LEVY
BY
HIS ATTORNEY

May 8, 1951 S. LEVY 2,551,683
INDICATOR
Filed Feb. 23, 1949 2 Sheets-Sheet 2
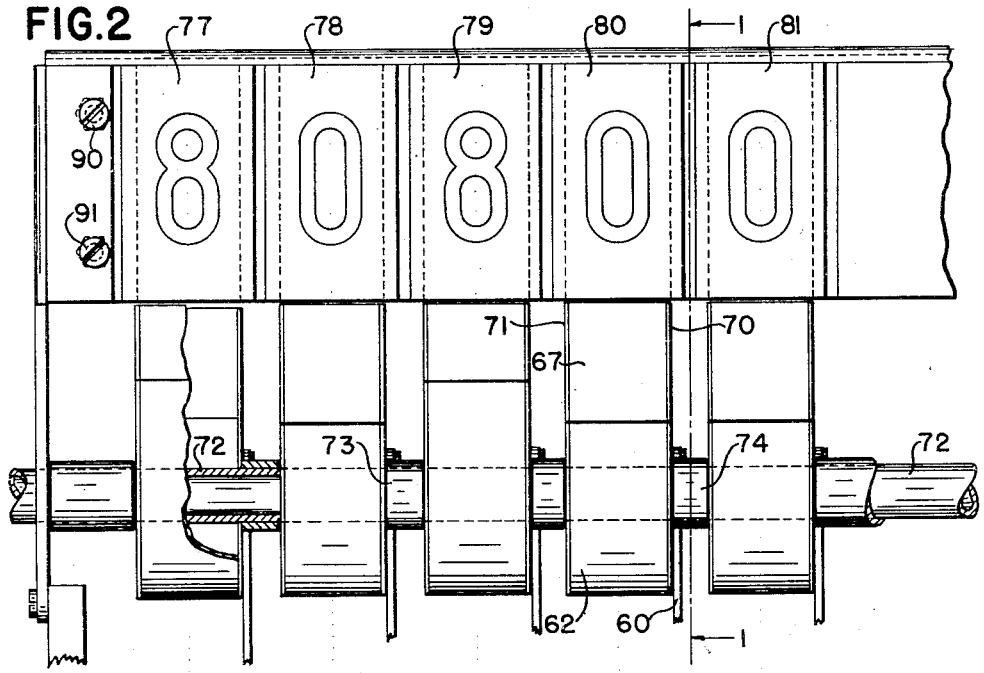
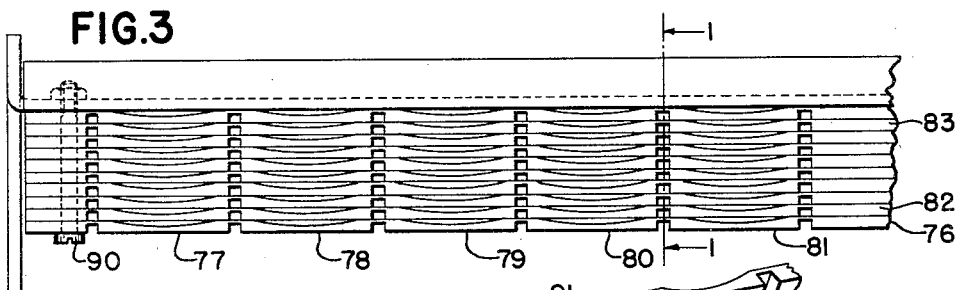
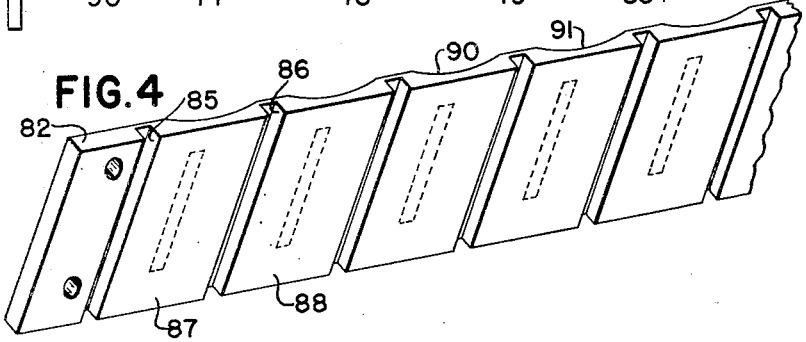
INVENTOR
SIDNEY LEVY
BY
Earl Beust
HIS ATTORNEY Patented May 8, 1951

2,551,683

UNITED STATES PATENT OFFICE 2,551,683

INDICATOR

Sidney Levy, Dayton, Ohio, assignor to The National Cash Register Company, Dayton, Ohio, a corporation of Maryland Application February 23, 1949, Serial No. 77,948

8 Claims. (Cl. 250—71)

This invention relates to an illuminated indicator, and more particularly pertains to one in which there are a plurality of normally invisible indicia which are selectively made visible by directing invisible light radiation thereat to cause a visible fluorescent response.

The indicator includes a stack or pack of transparent or highly translucent plate-like members which may be individually edge-lighted from a selectively operable light source which illuminates the interior of the selected members with invisible light and causes visible fluorescence of indicia applied thereon with transparent or highly translucent fluorescent material.

In the preferred embodiment of the invention, which will be described, use is made of polymerized methyl-methacrylate for the plate-like members, a source of invisible light of approximately 3650 Å., and fluorescent material of the pyrene or anthracene type. Moreover, the internal illumination of a plate member is localized to itself by means of total internal reflection brought about by properly directed incident light and air boundary layers between plates. Other ultra-violet light sources, and other fluorescent materials may be used, however.

The invention contemplates the use of other plate material, glass for instance being suitable. Moreover, a transparent filter material, as Wratten filter #2, may be used between each two plates to prevent illumination of more than one plate if it is desired not to use total reflection phenomena for that purpose.

Viewed from an end of a stack, the particular indicia caused to fluoresce will appear through the intervening transparent or translucent plates. It will be apparent that the deeper a plate is buried in a stack the more difficult it will be to observe as every intervening surface and substance cuts down the amount of light transmitted. To compensate for this, the deeper plates in the stack may be supplied with more or more highly reactant fluorescent material or may be made thicker to admit more illumination from the edge.

The indicator will be shown used in conjunction with a calculating or registering machine for which it is especially designed, for indicating amounts or other data registered. One of the chief characteristics demanded for indicators of such machines is a wide angle display of the indicia, and to this end the plates of the novel indicator are optically shaped so that the indicia on plates buried deep in a stack may be seen from a relatively wide angle in a horizontal plane.

The indicator plates of the device are stationary, selection being provided for by means of movable light-directing members selectively illuminating the edges of the plates bearing the indicia to be displayed.

So far, in describing the invention generally, reference has been made to stacks or packs of plates or plate-like members. In the particular embodiment of the invention to be described in connection with the drawings, an indicator is shown for registering a number of five digits, which would ordinarily require five stacks or packs of ten plates each, there being one indicia-bearing plate for each of the ten digits of a denomination. As an efficient design in applying the invention, a single molded piece of polymerized methyl-methacrylate provides the five plates of a given stack level. For instance, all the plates which bear the indicia "1" are in the same level and may be molded as parts or sections of the same member. Insulating channels are cut in the molded member between indicia to prevent side leakage of illumination to other indicia on the same level. There are ten molded members, containing five indicia-bearing plates each, in this particular arrangement.

It is an object of this invention to provide an indicator in which a selected one from among a number of invisible super-posed indicia is rendered visible by directing invisible light rays thereto.

It is another object of the invention to use for such indicia substantially transparent material which is rendered visible by application of invisible ultra-violet light thereto.

Another object of the invention is to provide such an indicator in which the indicia are on individual super-posed transparent plates or members which are illuminated by the exciting invisible light from the edges thereof and in which selection is made by directing the invisible light to the edge of the selected plate only.

A further object of the invention is to provide such an indicator wherein the rays directed to one plate of a stack are retained within the boundaries of that plate and not permitted to cause fluorescence of indicia of other plates.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 1 is a vertical section, from front to rear, of a typical registering machine of the general type disclosed in the Shipley U. S. Patent No. 1,619,796 and in the Spurlino U. S. Patent No. 2,373,510, showing a key-controlled differential mechanism used for selectively setting the novel light directing means associated with a denominational order, and a vertical section through a stack of indicia-bearing plates, on the line 1—1 of Figs. 2 and 3.

Fig. 2 is a fragmentary front elevation of the indicating portion of the device.

Fig. 3 is a top plan view of the plates of the indicator of Fig. 2.

Fig. 4 is a perspective view of that one of the molded members of Fig. 3 which bears the indicia "1."

Figure 1:
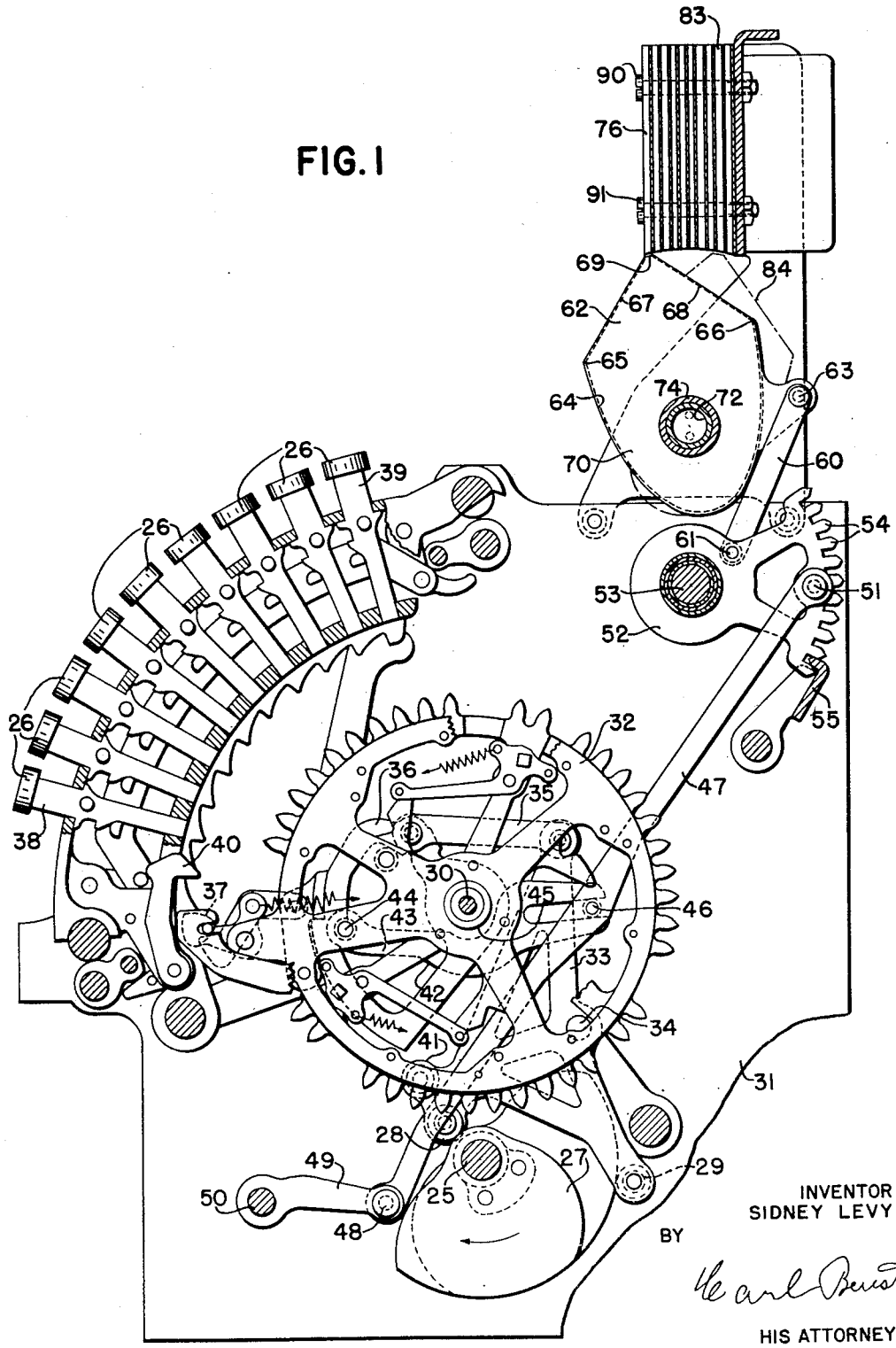

In the Shipley and Spurlino type of registering machines to which reference has been made, a main drive shaft 25 (Fig. 1) is given one complete rotation clockwise, from the position shown, in a given registering operation cycle. For each denominational order of the machine there is provided a bank of digit keys 26, a selected one of which is pushed inwardly previous to a machine operation, the inward end acting as a stop. A differential rack member 32 is also is provided in each denominational order and is urged to move clockwise around supporting shaft 30 through the action of drive cam member 27, attached to shaft 25, on roller cam followers 28 and 29 supported on a lever 33 rockably supported on a stud 34 and connected pivotally by a link 35 to segment 36, loosely supported on shaft 30 and latched to said rack member. As a latch arm 37 strikes the inner end of a depressed key the latch connection between rack member 32 and segment 36 is broken and the rack member is left with an angular movement, clockwise from the normal position shown, until the last half of the registering cycle when it is returned to home position. The angular position of rack member 32 away from its home position is a measure of the value of the key depressed, the lowermost key 38 having a value of "1" and the keys increasing in value to the "9" key 39. If no key is depressed a zero stop 40 breaks the latch connection so the rack member 32 moves a slight angular distance representing zero.

During the middle portion of a registering cycle roller 41 engages the underedge 42 of a beam member 43 pivoted at 44 to rack member 32 and forces the upper edge of said beam against surface 45 of a hub associated with the rack member. As a consequence, with the aid of pawl 55, to be described, on return of the rack member 32 and lever 33 to home position, the beam is left in moved position, retaining the differential position determined by the key depressed, or a zero position if no key is depressed.

A rearwardly extending fork on the beam engages a stud 46 on a link 47 pivoted at 48 to a support lever 49, itself pivoted on stud 50. The upper end of link 47 is pivoted at 51 to an aligning segment 52 rotatably supported on shaft 53. Segment 52 has teeth 54 engaged by aligning pawl 55 near the mid-point in the machine cycle to hold the set position of the beam 43. The angular movement of the segment 52 from normal position is a measure of the amount registered in that denominational order of the machine in that cycle of operation, and the movement of that segment is used to control the light directing means of the portion of the indicator associated with that denomination.

All the foregoing mechanism is shown in the patents to which reference has been made and is disclosed as a way in which the novel indicator may be incorporated in such mechanism.

There is a segment, like segment 52, for each denominational order and each is individually settable under control of the keys of the associated denominational order during a registering operation. The setting of a segment is retained by its aligning pawl 55 until the next operation of the register.

Associated with segment 52 is a link 60 (Figs. 1 and 2) pivoted to the segment at 61 and pivoted to an associated light directing member 62 at 63. Light directing member 62 is typical of those provided for the different denominations and comprises an aluminum can having a vertical cross-section from front to rear as seen by the shape of a side in Fig. 1 which has an elliptical lower portion 64 ending at points 65 and 66 where the walls 67 and 68 form a 90° included angle ending in a slit opening 69. The sides 70 and 71 of can 62 are flat and are provided with aligned holes, the axis of which holes is common with the axis of the focus of the said elliptical portion. The holes permit the passage therethrough of an ultra-violet light tube 72 which acts as a common support for all the light directing members and on which they may be rocked for differential positioning. Spacing collars 73, 74, etc., are provided between adjacent units.

The indicia are carried on molded polymerized methyl-methacrylate members like shown in Fig. 4, there being ten members in a stack as shown in Fig. 3. Each molded member has a plurality of indicia-bearing sections thereon, there being one for each denominational order of the machine. The ten members represent the digits of the decimal system. To excite a particular indicia the light-director of the appropriate denomination is positioned under control of the selected digit key of that denomination.

As will be seen from Fig. 1, the movement of the light directing member 62, taken as typical, is limited, its most counter-clockwise position being shown where slit aperture 69 is directly beneath molded methyl-methacrylate member 76 on which the indicia "0" appears on each of the section surfaces 77, 78, 79, 80 and 81, as seen in Fig. 3. Member 82 has the indicia "1" thereon at each of the denominational positions. The positioning of a light-directing member of any order under control of the associated "1" key will bring its aperture, corresponding to aperture 69, beneath the member bearing the indicia "1." Thus, for instance, molded member 83, bearing the "8" indicia on the surface of the sections or plates thereof, will be selected by the use of the "8" key of a denominational order, and the indicium "8" will become fluorescent in said order. This condition is shown by the dotted line representation 84 in Fig. 1.

The molded member 82 of Fig. 4 is typical of the ten members forming the pack or stack shown in Fig. 3, bolted together by bolts such as bolts 90 and 91 (see also Figs. 1 and 2) to the frame of the machine. Each member is divided into sections like sections 87 and 88, by vertical channels, such as channels 85 and 86, to prevent transmission of ultra-violet or fluorescent light sideways from section to section.

The indicia are applied to the rear faces of the members by use of a dryable solution containing a fluorescent material. The following is a typical solution useful for such a purpose.

| | Parts by weight |
|---|---|
| Anthracene or pyrene | 1 |
| Polymerized methyl-methacrylate | 15 |
| Toluene | 100 |

This solution will, when dried, fluoresce when subjected to ultra-violet radiation in the vicinity of 3650 Å which is transmissible through the molded methyl-methacrylate members. Such ultra-violet light will be reflected from the polished aluminum inner surfaces of the light-directing members. Such light may be produced by low-pressure mercury vapor fluorescent ultra-violet "black light" tubes, such as type BL 360 which may be purchased commercially from Sylvania Electric Products, Inc. Such tubes have special glass which filters out the visible rays.

As will be seen in Fig. 1, the lower surface of the pack of molded methyl-methacrylate members is shaped to conform to the arc of travel of the upper ends of the light-directing members so that a close approximation of the slit apertures to the various members may be made to avoid straying of the ultra-violet light.

The rear surface of each section of the indicia-bearing members is given a concave cylindrical shape with a vertical axis, as seen at 90 and 91 of Fig. 4, which in conjunction with the plane front surface forms a plano-concave cylindrical lens which tends to make the images of fluorescent indicia to the rear thereof to appear in front of their actual position with the result that the rearmost indicia may be seen over a relatively wide horizontal angle from in front of the stack. The deeper the fluorescent indicia is in the pack the more the image is so affected, as more lens structures come into play. The curvature may have a radius of about ten inches.

The air gaps between members, caused by the cylindrical curvature thereof, form light boundary surfaces which serve to prevent transmission of the ultra-violet light forwardly or rearwardly from the member at which the light director is aimed.

The apertures of the light-directing members are narrow enough so that none of the ultra-violet light escapes into the air gaps caused by the cylindrical curvature of the platelets.

The ultra-violet light producing tube 72 is connected to sources of electrical potential in the usual manner and kept ignited during the entire period the indicator is in use.

It is within the scope of this invention to supply a separate ultra-violet light source for each level of the stack and indicate selectively by causing a selected one of said sources to excite the associated indicia.

While the form of the invention herein shown and described is admirably adapted to fulfill the objects primarily stated, it is to be understood that it is not intended to confine the invention to the form or embodiment herein disclosed, as it is susceptible of embodiment in various forms all coming within the scope of the claims which follow.

What is claimed is:

1. An indicator including a stack of substantially transparent indicia carriers, said carriers being plate-like, in face to face relation in the stack, and each being separated from its neighboring carriers in the stack by a light-boundary surface such that when a carrier is internally illuminated by invisible ultra-violet light rays projected against an edge of said carrier it is the only one of the stack illuminated; substantially transparent indicia on the carriers which indicia visibly fluoresce on interior illumination of the associated carrier with invisible ultra-violet light rays; and means to internally illuminate any selected one of said carriers with invisible ultra-violet light rays so the indicia thereon becomes visibly fluorescent and consequently viewable through the stack, said illuminating means including a stationary ultra-violet light source and a directional reflector which is movable to concentrate the ultra-violet light on the edge of any selected carrier.

2. The indicator of claim 1 in which the light boundary surfaces are formed by an air gap.

3. The indicator of claim 1 in which indicia carriers are polymerized methyl-methacrylate plates.

4. The indicator of claim 1 in which each carrier of indicia is formed in the shape of a plano-concave cylindrical lens.

5. The indicator of claim 4 in which the axes of the lenses of the carriers in a stack are in alignment.

6. The indicator of claim 1 in which the source of ultra-violet light is a low pressure mercury vapor fluorescent electric discharge tube.

7. The indicator of claim 6 in which the tube is covered by a slit-containing light enclosure rockable with respect to the tube so the slit may be directed at an edge of any selected carrier to direct ultra-violet rays thereto.

8. The indicator of claim 1 in which carriers buried deeper in the stack than those at the viewing end have more fluorescent material used in making the indicia thereon to compensate for loss of visible illumination in traversing intervening carriers.

SIDNEY LEVY.

REFERENCES CITED

The following references are of record in the file of this patent:

UNITED STATES PATENTS

| Number | Name | Date |
|---|---|---|
| 1,138,124 | Lawrence | May 4, 1915 |
| 1,762,760 | Chalkley, Jr. | June 10, 1930 |
| 1,813,491 | Gillard | July 7, 1931 |
| 1,850,319 | Fensom et al. | Mar. 22, 1932 |
| 1,930,359 | Hilgenberg | Oct. 10, 1933 |
| 2,132,094 | Brodton | Oct. 4, 1938 |

FOREIGN PATENTS

| Number | Country | Date |
|---|---|---|
| 541,879 | Great Britain | Dec. 16, 1941 |

OTHER REFERENCES

Modern Plastics—April 1946, pp. 144 and 145.